(12) United States Patent
Sullivan et al.

(10) Patent No.: US 11,287,169 B2
(45) Date of Patent: Mar. 29, 2022

(54) SYSTEM AND METHOD FOR CONTROLLING A COOLING SYSTEM

(71) Applicant: TRANE INTERNATIONAL INC., Davidson, NC (US)

(72) Inventors: Brian T. Sullivan, La Crosse, WI (US); Lee R. Cline, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 422 days.

(21) Appl. No.: 16/015,331

(22) Filed: Jun. 22, 2018

(65) Prior Publication Data

US 2019/0120532 A1  Apr. 25, 2019

Related U.S. Application Data

(63) Continuation of application No. 14/729,400, filed on Jun. 3, 2015, now Pat. No. 10,006,685.

(60) Provisional application No. 62/007,171, filed on Jun. 3, 2014.

(51) Int. Cl.
*F25B 49/02* (2006.01)

(52) U.S. Cl.
CPC ........ *F25B 49/022* (2013.01); *F25B 2600/02* (2013.01); *F25B 2600/11* (2013.01); *F25B 2600/13* (2013.01); *Y02B 30/70* (2013.01)

(58) Field of Classification Search
CPC .............................. F25B 49/022; Y02B 30/70
See application file for complete search history.

(56) References Cited

U.S. PATENT DOCUMENTS

| | | | |
|---|---|---|---|
| 5,040,377 A | 8/1991 | Braun et al. | |
| 5,600,960 A | 2/1997 | Schwedler et al. | |
| 5,963,458 A | 10/1999 | Cascia | |
| 6,185,946 B1 | 2/2001 | Hartman | |
| 6,257,007 B1 | 7/2001 | Hartman | |
| 7,836,713 B2 | 11/2010 | Lifson et al. | |
| 8,096,139 B2 | 1/2012 | Taras et al. | |
| 2010/0076607 A1 | 3/2010 | Ahmed et al. | |
| 2010/0088261 A1 | 4/2010 | Montalvo | |
| 2011/0113798 A1 | 5/2011 | Pichai | |
| 2011/0283718 A1 | 11/2011 | Ueda | |
| 2012/0065805 A1 | 3/2012 | Montalvo | |
| 2013/0345880 A1 | 12/2013 | Asmus | |
| 2014/0190681 A1* | 7/2014 | Chainer | H05K 7/20836 165/289 |
| 2014/0208322 A1* | 7/2014 | Sasaki | G06F 9/5077 718/1 |

* cited by examiner

*Primary Examiner* — Nathan L Laughlin
(74) *Attorney, Agent, or Firm* — Hamre, Schumann, Mueller & Larson, P.C.

(57) ABSTRACT

Cooling systems and methods of controlling a cooling system which includes one or more pumps and one or more fans, wherein the pumps and the fans are controlled by a controller. The controller controls the cooling system by a determination of an operation of the cooling system for sequencing activations, deactivations, and/or controlling parameters of the pumps, the fans, and/or other component(s) of the cooling system based on a first sensitivity of a power input as a function of lift, and a second sensitivity of a power input as a function of lift.

20 Claims, 10 Drawing Sheets

SYSTEM AND METHOD FOR CONTROLLING A COOLING SYSTEM

FIELD

This description relates generally to systems and methods for optimizing power used by a chiller plant by determining chiller plant load based on a combination of chiller plant operating conditions.

BACKGROUND

A cooling system of a building can have one or more chiller plant(s). Each chiller plant can have one or more cooling tower(s) connected via one or more fluid circuit(s) to one or more chiller(s). The cooling system can include one or more HVAC unit(s) (heating, ventilation, and air conditioning unit). An HVAC unit can include a chiller (e.g., a water chiller). One or more pump(s) direct the flow of fluid(s) in the fluid circuit. One or more pump(s) can include a condenser pump. The condenser pump directs the flow of (e.g., pumps) the fluid (e.g., water) from the cooling tower towards the chiller(s) in the fluid circuit of a condenser system. The condenser pump can also direct the flow of the fluid away from the chiller to the cooling tower. In operation, the condenser pump directs the flow of (e.g., pumps) cold fluid (e.g., cold water) from the cooling tower to a condenser side of the chiller, where the fluid is heated by a refrigeration cycle driven transfer of heat from the evaporator of the chiller (the heat being rejected from a building, for example). The heated fluid is directed to flow as a hot fluid (e.g., hot water) to the cooling tower. The cooling tower receives the hot fluid and cools the hot fluid by transfer of heat from the hot fluid to the atmosphere. The cooling tower can have one or more motorized fan(s). The cooling tower can have one or more cells, wherein each cell includes one or more motorized fan(s). The cell is a subdivision of the cooling tower. Each cell can be operated independently. In operation, the cooling tower directs a flow of air past the hot fluid to enhance transfer of heat from the hot fluid to the atmosphere. The hot fluid becomes a cooled fluid at the cooling tower. The cooled fluid is then collected at the cooling tower (e.g., with a collection basin in the cell) and directed towards the chiller(s) via the fluid circuit. The cooling tower supplies the chiller with the condenser fluid supply (e.g., cooled water) by cooling the condenser fluid return (e.g., hot water) directed from the chiller to the cooling tower. Generally, both of the condenser pump and the fan in the cooling tower require power to operate.

BRIEF SUMMARY

The systems and methods disclosed herein are directed towards optimizing power used by a chiller plant by determining chiller plant load based on a combination of chiller plant operating conditions.

A condition is a situation in which a device is operating under. For example, but not limited to, the condition can be temperature(s) and/or pressure(s) of the cooling system that can be detected and/or measured. An operating condition is a condition in which the cooling system (or a part of the cooling system, such as each specific component and/or groups of components) is operating in (or under). Chiller plant operating conditions include, for example, but are not limited to: compressor(s) power draw, compressor current draw, condenser refrigerant pressure, condenser refrigerant temperature, condenser water temperature, evaporator refrigerant pressure, evaporator refrigerant temperature, evaporator water temperature, etc.

The systems and methods disclosed herein are also directed towards determination of a high and/or low limit condition(s), for example, based on a scaled surge line, such as, for example, in a centrifugal compressor. The high limit condition can be a situation wherein the cooling system is operating (or attempting to operate, or needs to operate) at (or near) maximum parameter(s). The low limit condition is a situation wherein the cooling system is operating at (or attempting to operate, or needs to operate) (near) minimum parameter(s).

The embodiments of the systems and methods disclosed herein are directed towards controlling power input(s) to one or more component(s) (e.g., one or more chiller(s), pump(s), tower fan(s), etc.) of a cooling system (e.g., a water-cooled chiller plant system) for optimizing and/or reducing the total power used by the cooling system.

A parameter is a setting for a condition, wherein the parameter can be controlled (e.g., set) by the controller. Accordingly, an operational parameter can be a setting that can be controlled by the controller for operating the entire cooling system, subpart(s) of the cooling system, and/or one or more component(s). Thus, the controller can set a particular parameter in order to achieve (or for achieving) a set condition(s) and/or based on a detected, measured, and/or assumed condition(s).

Controlling the one or more component(s) of the cooling system can include determining a parameter (e.g., an operational parameter, sequencing operations of components, etc.) of the cooling system by determining individual parameter(s) (e.g., activation(s), deactivation(s), increase speed(s), decrease speed(s), increase flow rate(s), decrease flow rate(s), and/or change in other parameters) of the one or more component(s) (e.g., tower fan, pump, etc.).

The individual parameter(s) can be determined by determining a first sensitivity of a power input to the one or more component(s) (e.g., chiller(s)) as a function of lift, and determining a second sensitivity of a power input to another component(s) (e.g., different from the component used in determining the first sensitivity) as a function of lift.

Embodiments of the systems and methods include optimizing (or improving) power usage of a cooling system by a controller determining a first sensitivity of a power input to one or more chiller(s) as a function of lift; the controller determining a second sensitivity of a power input to one or more other components (e.g., not a chiller) as a function of lift; and the controller aligning the first sensitivity with the second sensitivity.

Embodiments of the systems and methods include optimizing (or improving) power usage of a cooling system by a controller operating according to a previously determined setting, wherein the previously determined setting is performed by a specialized computer. The specialized computer determining a first sensitivity of a power input to one or more component(s) (e.g., chiller(s)) as a function of lift; the specialized computer determining a second sensitivity of a power input to one or more other components (e.g., not a chiller) as a function of lift; and the specialized computer aligning the first sensitivity with the second sensitivity.

Embodiments of the systems and methods include the controller which includes (and/or is in communication with) the specialized computer.

In an embodiment, the controlling of the component(s) of the cooling system can also include aligning the first sensitivity with the second sensitivity.

The controlling the component(s) can include sequencing activations, deactivations, and/or controlling other parameters of the one or more component(s).

An embodiment of the systems and methods includes sequencing activations and/or deactivations of sequencing tower cells.

Another embodiment of the systems and methods includes sequencing activations and/or deactivations of sequencing only the tower cells.

The term "lift" is used herein to include, but is not necessarily limited to, a difference between a condenser condition and an evaporator condition, a difference in refrigerant conditions, and/or a difference in water conditions, etc. Examples of the condenser condition include, but are not necessarily limited to, a condenser refrigerant pressure, a condenser refrigerant temperature, a combination of the condenser refrigerant pressure and the condenser refrigerant temperature, condenser water temperatures, and a combination of condenser water temperatures and condenser refrigerant temperatures. Examples of the evaporator condition include, but are not necessarily limited to, an evaporator refrigerant pressure, an evaporator refrigerant temperature, a combination of the evaporator refrigerant pressure and the evaporator refrigerant temperature, evaporator water temperatures, and a combination of evaporator water temperatures and evaporator refrigerant temperatures.

The term "sensitivity" is used herein to include, but is not necessarily limited to, a change in a parameter (e.g., a property such as, for example, temperature, energy, power, pressure, time, speed, flow rate, etc.) with respect to a change in another (e.g., different) parameter. Accordingly, the step of determining the first sensitivity of the power input to one or more chiller(s) (e.g., at a given operational parameter) as the function of lift can mean, for example, determining how the power input to one or more chiller(s) is changed as the lift across that chiller changes by, for example, 1 degree (e.g., with respect to lift, which can be a change in condition such as, for example, pressure, temperature, or a combination of pressure and temperature, etc.). Accordingly, Sensitivity can be represented as $\Delta kW/\Delta lift$.

Further, the step of determining the second sensitivity of a power input to one or more other component(s) (e.g., different from the component(s) used in determining the first sensitivity) as a function of lift can mean, for example, determining how the power input to one or more other component(s) is(are) changed as a function of lift for the chiller(s) (e.g., with respect to lift, which can be a change in condition such as, for example, pressure, temperature, or a combination of pressure and temperature, etc.).

Examples of the one or more other components include, but are not necessarily limited to, a cooling tower fan(s), pump(s), etc.

Determining the sensitivity of the chiller tower fan(s) can include, for example, determining how much change in power for the tower fans is needed to change the lift by 1 degree for one or more of the operating chiller(s).

Determining the sensitivity of the pump(s) can include, for example, determining how much change in power is needed to change the lift by, for example, 1 degree for one or more of the operating chiller(s).

Aligning the first sensitivity with the second sensitivity can include, for example, setting the two sensitivities equal to each other and defining the power setpoints based on the alignment of the two sensitivities. For example, the aligning of the two sensitivities can include determining a slope of $\Delta kW/\Delta lift$ (or $\Delta set$ temperature) to provide a limit which can define, for example, a kW to tonnage relationship(s). For example, for a given plant load and a condition (e.g., a situation in which the cooling system or any combination of its components is operating in, such as for example, but not limited to, environmental condition(s), etc.) the power input to the tower fans can be adjusted until the $\Delta kW/\Delta lift$ for the tower fans is equal to the $\Delta kW/\Delta lift$ for the chiller(s). In another example, the condenser pump power can be adjusted until the $\Delta kW/\Delta lift$ for the condenser pumps is equal to the $\Delta kW/\Delta lift$ for the chiller(s). The aligning can lead to a determination of how the chiller and/or the component(s) react to power input thereto.

The systems and methods disclosed herein can improve operating efficiency of the cooling system (or one or more chiller plant(s) of the cooling system) by controlling power input to various components (e.g., the condenser pump(s) and/or the tower fan(s)) of the cooling system. The methods can be applied to optimize the summation of power input to any one or more, or all of the cooling system heat rejection components (e.g., one or more, or all of condenser pump(s), cooling tower fan(s), and/or water-cooled chiller(s)).

In some embodiments, the systems and methods can include controlling the controlling parameter(s) (e.g., speed) of one or more of the condenser pump motor(s) and/or the tower fan motor(s) so that the power used by these component(s) result in a value that is the same and/or comparably similar to a power setpoint value from an optimization process. The power setpoint value from the optimization process can be predetermined and stored into a non-transitory memory of a computer. Some embodiments can include monitoring the conditions for the cooling system to provide alternative controlling parameters of the pump motor(s) and/or the tower fan motor(s) when the monitored data of the cooling system approaches an operational limit (e.g., a predetermined low operational limit and/or a predetermined high operational limit). An operational limit can be a situation where a device is set at a maximum or minimum parameter(s). An operational limit can be a situation where a device is functioning at a maximum or minimum capability.

Some embodiments of the systems and methods can be scalable for optimizing additional components' operational parameters (e.g., multiple pumps, fans, etc.) where additional power input may be desired, needed, required, and/or used.

Some embodiments of the systems and methods can determine power provided to the components by an amount of heat to be removed from the cooling system (or one or more chiller plant(s) of the cooling system).

An embodiment of the systems and methods includes determining a cooling system load based on a function of change in temperature ($\Delta T$) and the flow rate.

Another embodiment of the systems and methods includes measuring a flow rate and temperature drop across a chiller plant with a determination (e.g., a direct calculation) of chiller load. For example, the determination of chiller load can be done with the total flow to and from the chiller plant along with the temperature change, and/or separately on each of the operating chillers of the chiller plant with the individual results being summed to determine the total flow rate and/or temperature drop.

Another embodiment of the systems and methods includes determining the chiller plant chilled water load (e.g., cooling capacity) by determining the amount of heat being rejected to the cooling tower by measuring the flow rate to the cooling tower and the temperature difference into and out the cooling tower(s) to determine the total heat rejection. In some embodiment, to determine the chilled water load, the heat of the compression as determined by the power input to the operating chillers is subtracted from the total heat rejection to the cooling tower(s). This can also be done separately (e.g., independently) for each operating chiller with the results being summed to determine the total chiller plant chilled water load.

In another embodiment, to determine the chilled water load, the systems and methods can include a specialized computer and/or the controller using a chiller computational model for the one or more of the operating chiller(s) to approximate the chilled water load by using the load input to the compressor motor in combination with any one or more of temperature and/or pressure condition(s) of the evaporator and condenser heat exchangers.

Embodiments of the systems and methods disclosed herein can include a predetermined scaling of the power to the load(s) for optimizing and/or determining power setpoints of power for one or more component(s) (separately, as subsets of components, and/or as a total set of the components). The term scaling, as used herein, includes, but is not limited by, power to load scaling, which may include, such as for example, linear scaling, non-linear scaling, optimized scaling, etc. The methods disclosed herein can use scaling that is independent of environmental conditions, such as for example, outdoor wet-bulb temperature(s). That is, the methods disclosed herein can control power to the load(s) that is independent of wet-bulb temperatures.

Embodiments of the systems and methods disclosed herein can include the aspect of not utilizing the scaling optimization at the upper and/or lower limits of the cooling system or one or more component(s) (e.g., chiller(s)). For a cooling system having, for example, multiple chillers, pumps, and/or fans, the full load value can be determined for a maximum power input parameter(s) with multiple components fully energized and then scaled from this maximum power input parameter(s). For example, the power input parameter(s) can be scaled down so that a desired (e.g., predetermined) performance capacity can be achieved with less power input into the system as a whole. As an alternative to or in addition to this, a partial load value can be determined and then the power can be scaled up and/or down so that a desired (e.g., predetermined) performance capacity can be achieved with more and/or less power input into the system as a whole.

The scaling of each component of the cooling system does not need to be the same. It will be appreciated that, due to differences in the performance characteristics of the individual components, the components can perform differently based on the sensitivities. Thus, it will be appreciated that the scaling at the component level of the system can vary. The scaling at the component level can be performed by determining a sensitivity of power inputs into the component to a system temperature (e.g., the power to load relationship between power input into the component and the cooling system temperature change).

In an embodiment of the systems and methods, the controller controls the operation of components of the cooling system (e.g., the pumps and/or the fans) so that, at or near the upper limits of the component operating conditions, the controller of the cooling system overrides the scaling (e.g., deviates the power to load relationship away from the scaling).

Further, in some embodiments of the systems and methods, at or near the lower limit(s) of the component operating conditions, the controller overrides the scaling and controls the one or more component(s) to deviate the power to load relationship away from the scaling in order to protect the one or more component(s) to avoid various low limit problems.

Another embodiment of the systems and methods can include considering the activation of cooling towers (e.g., fans and/or cells) that are not currently operating for a given operational parameter of a cooling system. In general, the activation of additional fans and/or cells will increase the heat transfer efficiency of the cooling tower by distributing the amount of heat rejection over a wider surface of heat exchanger. Although the action of activating a fan and/or cell may require added pumping power for a given operational parameter in order to generate enough flow to accommodate all running fans and/or cells to at least a minimum flow condition, the increased heat transfer surface area, the reduction of flow resistance across the air stream for the operating cooling towers (e.g., fans and/or cells), and the reduction of lift across the chillers may result in an overall system power reduction for the chiller plant. The process for the consideration of activating added fan(s) and/or cell(s) can consider the added power required by the pumping system to achieve the minimum flow requirement of all fans and/or cells including the fan(s) and/or cell(s) being considered for activation. If the power to the pumps and fans and/or cells after activation does not exceed an established ratio of power to the current scaled pump and fan power setpoints (e.g., 1.5 times) as determined by the scaling (e.g., a linear power setpoint), an added fan(s) and/or cell(s) can be brought online and the fans and/or cells are operated at a minimum flow condition, until the chiller plant load increases thereby increasing the pump power setpoint to a value that is higher than the power for maintaining the cooling tower (e.g., fan(s) and/or cell(s)) at the minimum flow condition.

DETAILED DESCRIPTION

Figure 1:
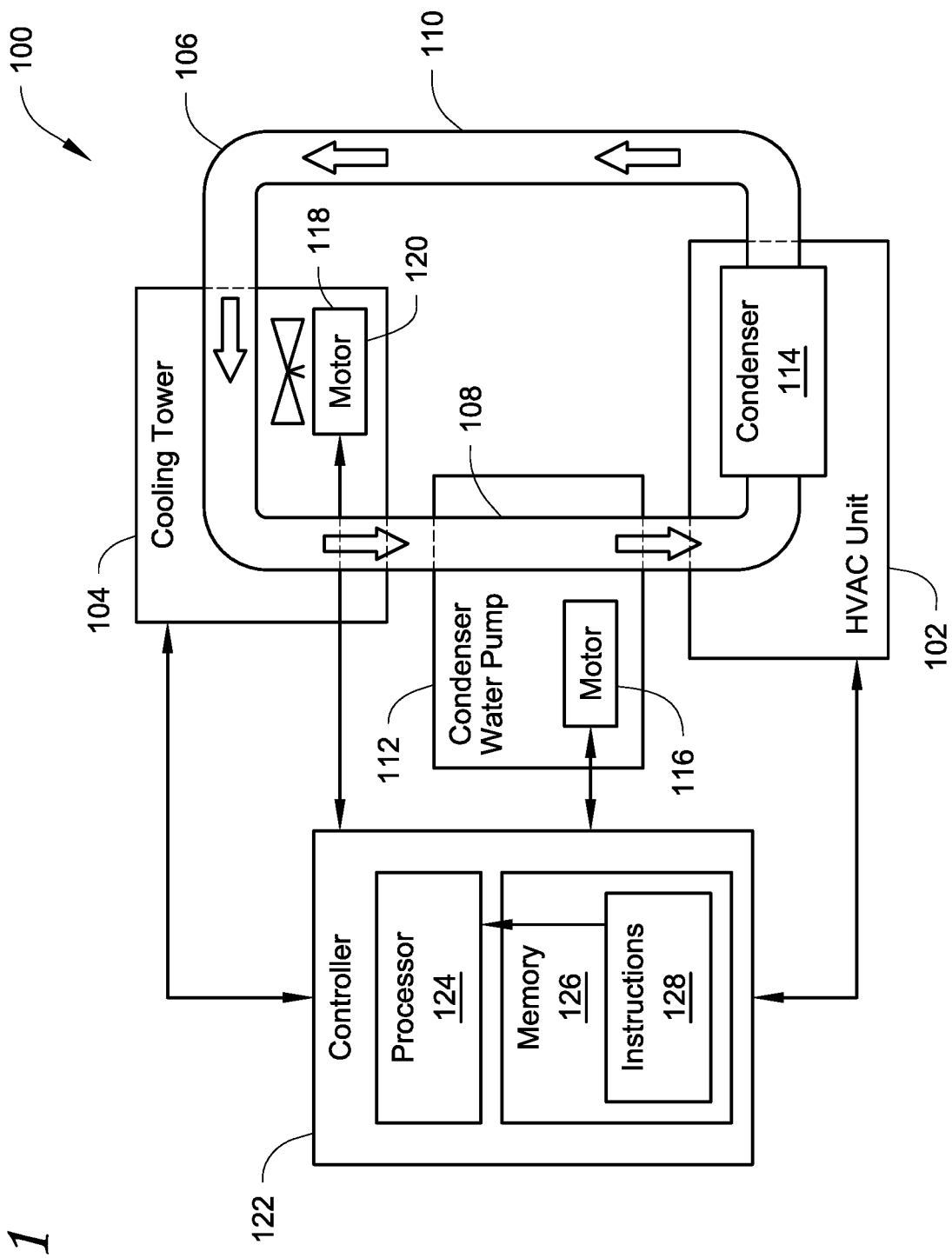
FIG. 1 shows a schematic diagram of a cooling system according to an embodiment.

The systems and methods may be further understood with reference to the following description and the appended drawings, wherein like elements are referred to with the same reference numerals. Some embodiments of the systems and methods disclosed herein are directed to controlling power inputs to one or more component(s) of a cooling system for optimizing the efficiency of power used by the cooling system, as a whole.

The one or more component(s) can include one or more variable capacity component(s). An example of a variable capacity component includes, but is not limited by, a variable capacity condenser pump, such as a variable speed condenser pump. Another example of a variable capacity component includes, but is not limited by, a variable capacity tower fan, such as a variable speed tower fan.

Some embodiments of the systems and methods disclosed herein are directed to controlling power inputs to a variable speed condenser pump and/or a variable speed tower fan of a water-cooled chiller plant system for optimizing the efficiency of power used by the water-cooled chiller plant system.

FIG. 1 shows a schematic diagram of a cooling system 100 according to an embodiment. The cooling system 100 includes a HVAC unit (e.g., which can be or include a chiller) 102 and a cooling tower 104 connected via a fluid circuit 106. The HVAC unit 102 can be a water-cooled chiller. The fluid circuit 106 has a condenser fluid supply side (e.g., cold water side) 108 and a condenser fluid return side (e.g., hot water side) 110. The fluid circuit 106 includes a pump 112 for pumping fluid (e.g., water) through the fluid circuit 106. For example, the pump 112 can be a condenser pump which operates to direct cooled fluid from the cooling tower 104 to a condenser side 114 of the HVAC unit 102 via the condenser fluid supply side 108. The pump 112 (e.g., the condenser pump) has a motor 116. In some embodiments, the pump 112 is a variable speed pump, and the motor 116 can be a variable speed motor (e.g., a motor controlled by a variable speed drive for controlling the speed of the motor), which allows the fluid flow speed (e.g., water flow speed) in the fluid circuit 106 to be controllable. Accordingly, the flow rate of the fluid through the fluid circuit 106 (e.g., from the cooling tower 104 to the HVAC unit 102) connected to the pump 112 can be controlled by controlling the speed of the motor 116. It will be understood that the cooling system 100 can have multiple chillers, multiple cooling towers (or multiple fans and/or multiple cells), multiple fluid circuits, and/or multiple pumps.

The cooled fluid becomes a hot fluid at the HVAC unit 102, as heat removed from a heat source (e.g., a building) is transferred to the condenser side 114 of the HVAC unit 102 and then to the cooled fluid, turning the cooled fluid into hot fluid. Then the hot fluid is directed to flow via the condenser fluid return side 110 of the fluid circuit 106 towards the cooling tower 104.

The cooling tower 104 receives the hot fluid from the HVAC unit 102 and cools the hot fluid by, for example, transferring the heat from the hot fluid to the atmosphere (e.g., ambient side). The cooling tower 104 includes a fan 118, and by operation of the fan 118 (and/or other components of the cooling tower 104), the hot fluid received by the cooling tower 104 is cooled by transfer of heat from the hot fluid to the ambient atmosphere. The fan 118 can be a variable speed fan connected to a motor 120, which in some embodiments can be a variable speed motor (e.g., a motor controlled by a variable speed drive for controlling the speed of the motor), so that the fan speed (e.g., rotation speed, air flow rate, etc.) can be controlled. That is, by controlling the speed of the motor 120, the speed of the fan 118 can be controlled, and thus the heat dissipation from the hot fluid to the ambient atmosphere can also be controlled.

The cooling system 100 includes a controller 122. An example of the controller 122 is a computer including a processor 124 and a non-transitory memory 126 in communication with the processor 124. In some embodiments, the controller 122 is (or includes, or can be connected to) a specialized computer specifically configured to perform the methods disclosed herein. The non-transitory memory 126 stores computer-readable instructions 128 which are executable by the processor 124. The computer-readable instructions 128 are directed to one or more methods for controlling one or more of the components of the cooling system 100 (e.g., power input to the pump motor 116 and/or the fan motor 120).

In an embodiment, the controller 122 operating according to the executed computer-readable instructions 128 is in communication with the pump motor 116 and/or the fan motor 120. The controller 122 can also be in communication with other components, such as, one or more sensors (or detectors) for detecting, for example, temperatures and/or pressures at various points in the cooling system 100, a power input and/or power usage by the pump motor 116, the fan motor 120, etc.).

In an embodiment, the controller 122 can include computer-readable instructions 128 for carrying out a method of determining a first sensitivity of a power input to one or more chillers as a function of lift, determining a second sensitivity of a power input to one or more other components as a function of lift, and then aligning the first sensitivity with the second sensitivity.

For example, the controller 122 communicating with the sensors and/or detectors can determine power usage by one or more component(s) of the cooling system 100 and the evaporator and condenser saturation temperatures to determine a chiller load. The controller 122 can determine power input to one or more component(s) based on an amount of heat that needs to be removed from the cooling system 100. In operation, the controller 122 is configured to control the power inputs to both the pump motor 116 and fan motor 120 for optimizing the power input(s) to one or more component(s) of the cooling system 100 according to the instructions 128 executed by the processor 124. Further, the instructions 128 executed by the processor 124 provides the controller 122 with a process for optimizing the power input(s) to one or more component(s) of the cooling system 100 by a scaling based on data, which, for example, can include data collected via the sensors and/or detectors of the cooling system 100.

Figure 2A:
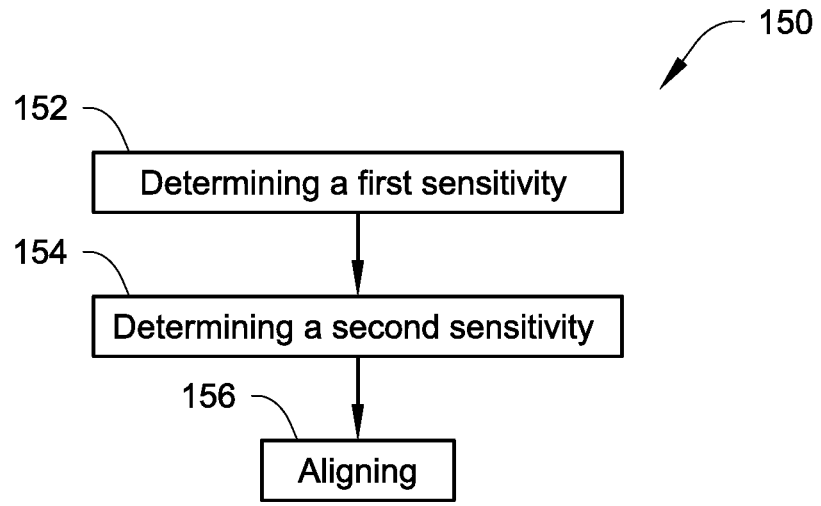
FIG. 2A shows a flowchart of a method for controlling the chiller plant according to an embodiment.

FIG. 2A shows an embodiment of the method 150 included in the computer-readable instructions (e.g., 128 in FIG. 1). It will be appreciated that the method 150 can be performed with a controller (e.g., 122 in FIG. 1) and/or a standalone computer that can operate the computer-readable instructions (e.g., 128 in FIG. 1) that models the chiller and other component performance to determine the power setpoints (e.g., power input parameters having a power to load relationship) for the one or more component(s) of the cooling system. Once the power setpoints are determined, a description of the power setpoints can be entered into the controller (e.g., 122 in FIG. 1). Accordingly, the term controller (e.g., 122 in FIG. 1) can include the standalone computer which can operate separately for determining the power setpoints, wherein the power setpoints are then communicated to the controller.

The method 150 includes a step 152 of determining a first sensitivity of a power input to one or more chillers as a function of lift, a step 154 of determining a second sensitivity of a power input to one or more other components as a function of lift, and then a step 156 of aligning the first sensitivity with the second sensitivity.

Figure 2B:
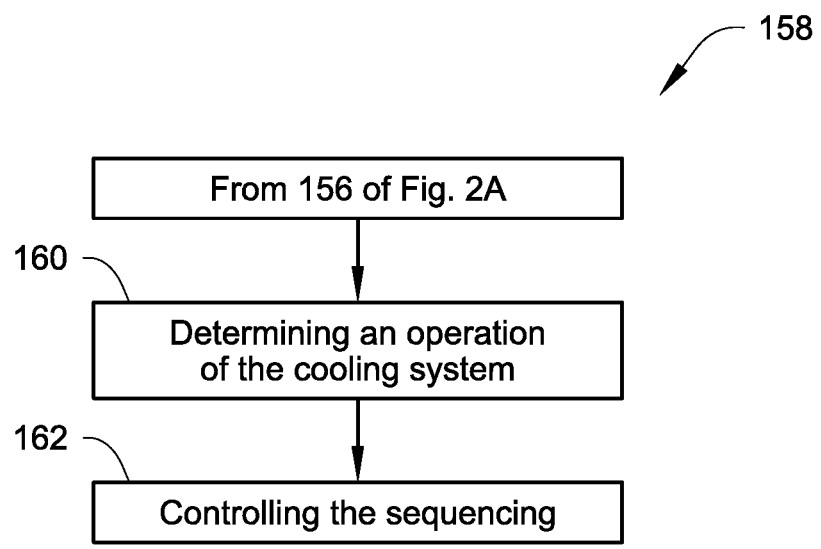
FIG. 2B shows a flowchart of another method for controlling the chiller plant according to an embodiment.

FIG. 2B shows another embodiment of the method 158, which includes all of the steps shown in FIG. 2A, wherein further to step 156 shown in FIG. 2A, the method 158 includes a step 160 of determining an operation of the cooling system for sequencing activations, deactivations, and/or controlling parameters of the one or more component(s) (e.g., tower fan, pump, etc.) based on one or more of the steps 152, 154, 156 shown in FIG. 2A (i.e., the first sensitivity, the second sensitivity, and/or the aligning of the first sensitivity with the second sensitivity), and then a step of 162 controlling the sequencing activations, deactivations, and/or controlling parameters of the one or more component(s).

Figure 3:
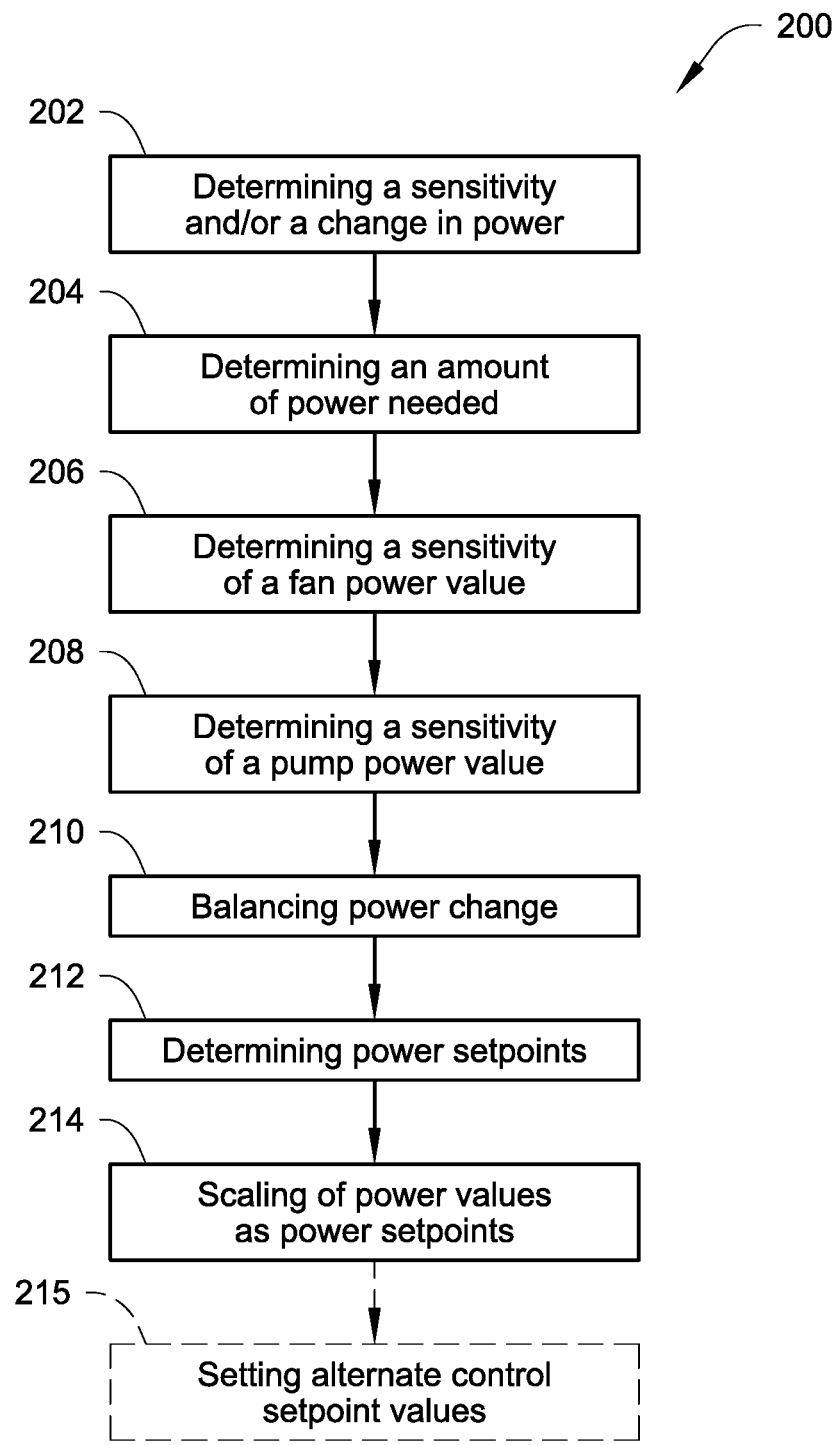
FIG. 3 shows a flowchart of a method for controlling the chiller plant according to an embodiment.

FIG. 3 shows another embodiment of the method 200 included in the computer-readable instructions (e.g., 128 in FIG. 1). It will be appreciated that the method 200 can be performed with a controller (e.g., 122 in FIG. 1) and/or a standalone computer that can operate the computer-readable instructions (e.g., 128 in FIG. 1) that models the chiller and one or more component performance(s) to determine the power setpoints for the one or more component(s) of the cooling system. Once the power setpoints are determined, a description of the power setpoints can be entered into the controller (e.g., 122 in FIG. 1). Accordingly, the term controller (e.g., 122 in FIG. 1) can include the standalone computer which can operate separately for determining the power setpoints, wherein the power setpoints is then communicated to the controller.

The method 200 is advantageous because tower fan control in typical control systems has generally been executed through the control of a leaving tower water temperature. However, fixed temperature control does not provide a way to balance the power usage of the cooling tower fan(s) against the power use of the chiller, for example, under a varying outdoor wet-bulb condition. In an embodiment of the methods for operating the chiller plant, a scaling of the cooling tower fan power usage is determined (e.g., predicted) for optimized behavior as compared to the amount of cooling load on the chiller plant and therefore the amount of heat rejection that is taking place.

Further, the method 200 can result in a user-friendly approach of controlling the tower fan(s), which includes modulating the activations and/or speeds of the fan(s) in relation to a power setpoint.

The power setpoints can be set as a function of the chiller plant load, such as for example, a scaled function (e.g., a scaling fit using a linear regression approach to modeling the relationship between the power setpoints, a scaled fit using a nonlinear regression approach, etc.) from an optimized full load power setpoint to zero power at zero load (or minimum speed). Thus, the method 200 can maintain near optimum behavior, for example, independent of various environmental conditions (e.g., outdoor wet-bulb temperature) and can avoid various issues associated with control schemes that employ, for example, wet-bulb calculations and/or assumed tower performance characteristics (e.g., performance characteristics that are stated in a handbook and/or determined in non-real world conditions).

Further, the method 200 can result in a user-friendly approach of controlling the pump(s) (e.g., condenser water pump(s)), which includes modulating the activations and/or speeds of the pump(s) in relation to a power setpoint. For example, the controller can provide various power setpoints for variable speed condenser water pumps to achieve the advantages similar to the control of the tower fan(s) described above.

With reference to FIG. 3, the method 200 includes a step 202 of determining the sensitivity and/or a change in power used by the chiller at a certain (e.g., full or other predetermined) chiller load and lift point to a change in lift. The method 200 includes a step 204 of determining an amount of power needed by the components of the cooling system (or one or more of the chiller plant(s) of the cooling system) at the certain chiller load. The method 200 includes a step 206 of determining a sensitivity of a fan power value to a change in system temperature and/or pressure (e.g., a relationship between power input into the fan and the chiller temperature and/or pressure change). The method 200 includes a step 208 of determining a sensitivity of a pump power value to a change in system temperature and/or pressure (e.g., a relationship between power input into the pump and the chiller temperature and/or pressure change). The method 200 includes a step 210 of balancing power change for the cooling system (or one or more of the chiller plant(s) of the cooling system) per degree saturation change. The method 200 includes a step 212 of determining power setpoints for the condenser pump and/or the tower fan. The method 200 includes a step 214 of scaling (e.g., setting a linear scale, setting a non-linear scale, etc.) of power values as power setpoints based on the data-points. In step 212, a series of power setpoints (e.g., power to load scaling) are set by the controller (and/or by a specialized computer) for controlling various aspects of the cooling system (or one or more chiller plant(s)) for efficient use of the power by the cooling system (or the chiller plant(s)) as a whole. That is, for example, the method 200 allows for the chiller plant load to be used to control the power setpoints for other components, such as for example, the condenser pumps and/or tower fans by the controller.

In some embodiments, a step 215 of setting alternate control setpoint values based on component power (in which case the control setpoint values can be identified as power setpoint values) or another system parameter such as temperature or pressure (e.g., deviating from the scaled power setpoints, and/or alternative system control schemes) for the purpose of controlling the pumps and/or fans when the system conditions are at (or near) upper and/or lower limits can follow step 214.

Figure 4A:
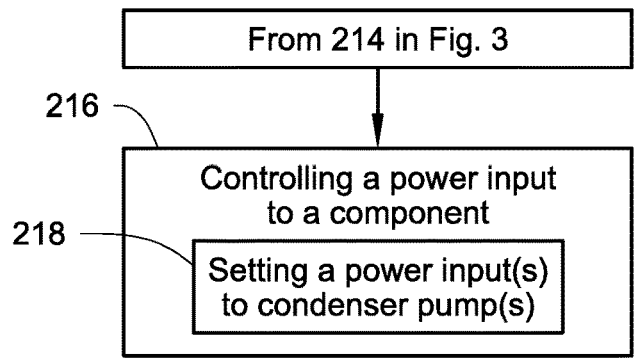
FIG. 4A shows a flowchart of a method for controlling the chiller plant according to an embodiment.
Figure 4B:
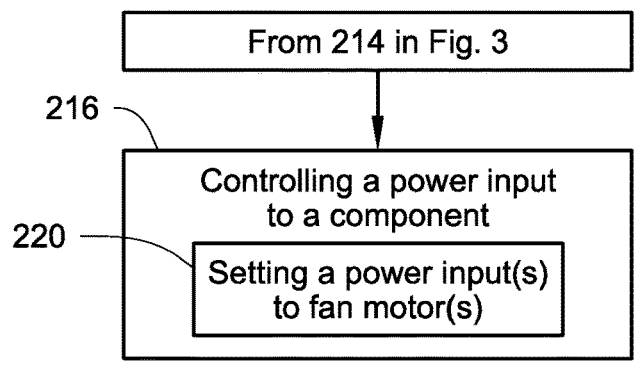
FIG. 4B shows a flowchart of a method for controlling the chiller plant according to another embodiment.
Figure 4C:
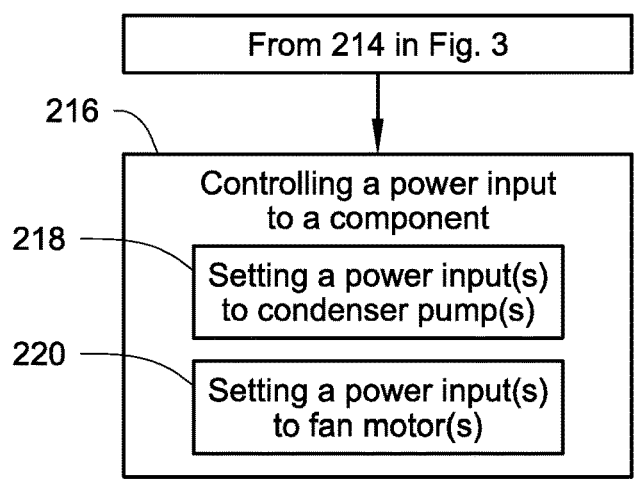
FIG. 4C shows a flowchart of a method for controlling the chiller plant according to yet another embodiment.

With reference to FIGS. 4A-4C, an embodiment of the methods (which include step 214 shown in FIG. 3) can include a step 216 of controlling a power input to a component of the cooling system based on the scaling of power values. The step 216 can, for example, follow the step 214 shown in FIG. 3. Controlling the power input to the condenser pumps can include, for example, controlling all operating pumps to a common speed setting and varying this speed setting until the summation of power to all operating pumps is equal to the power setpoint (e.g., the scaling).

As shown in FIG. 4A, the step 216 can include a step 218 of setting a power input(s) to one or more condenser pump(s) based on a scaling (e.g., a linear scaling or a non-linear scaling) of power values for controlling the variable speed motor(s) of the condenser pump(s) to control the flow rate(s) of the water in the fluid circuit(s). Setting the power input(s) can include, for example, controlling all controllable operating pump(s) to the same speed value and/or by varying this speed value until the summation of power to all operating pumps is equal to the power setpoint (e.g., the scaling). Setting the power input(s) to the condenser pump(s) can include, for example, activating and/or deactivating the condenser pump(s). Setting the power input(s) to the condenser pump(s) can include, for example, increasing the flow rate(s) or decreasing the flow rate(s) of the condenser pump(s). Setting the power input(s) to the condenser pump(s) can include, for example, decreasing the flow rate(s) of one (or more) of the condenser pump(s) and activating another one or more condenser pump(s). Setting the power input(s) to the condenser pump(s) can include, for example, increasing the flow rate(s) of one (or more) of the condenser pump(s) and deactivating another one or more of the condenser pump(s).

For example, as shown in FIG. 4B, the step 216 can include a step 220 of setting a power input(s) to a fan motor(s) based on the scaling of power to load relationship for controlling the variable speed motor(s) of the fan(s) and/or cell(s) of the cooling tower(s) to control the fan speed(s). Setting the power input(s) can include, for example, controlling all controllable operating fan motor(s) to the same speed value and by varying this speed value until the summation of power to all operating fan motor(s) is equal to the setpoint. Setting the power input(s) to the fan motor(s) can include, for example, activating and/or deactivating one or more of the fan motor(s). Setting the power input(s) to the fan motor(s) can include, for example, speeding up one or more of the fan motor(s) or slowing down one or more of the fan motor(s). Setting the power input(s) to the fan motor(s) can include, for example, slowing down one (or more) of the fan motors and activating one or more of another fan motor(s). Setting the power input(s) to the fan motor(s) can include, for example, speeding up one (or more) of the fan motors and deactivating one or more of another fan motor(s).

As shown in FIG. 4C, in some embodiments, the step 216 can include both steps 218 and 220. The step 216 can include setting a power input to one or more component(s) of the cooling system based on the scaling of power values determined in step 214.

In an embodiment, the method determines load from anywhere in the cooling system other than solely from the compressor(s).

In other embodiments, the method can require determination of load of a combination of components, except for the compressor(s) of the cooling system.

In other embodiments, the method requires determination of load of a combination of components, including the compressor and other components of the system. For example, an embodiment of the methods determines the compressor performance and/or power used (e.g., amps, kW, etc.) in conjunction with evaporator temperature(s) and/or pressure(s), and/or condenser saturation temperature(s) and/or pressure(s) to determine a chiller load.

Figure 5A:
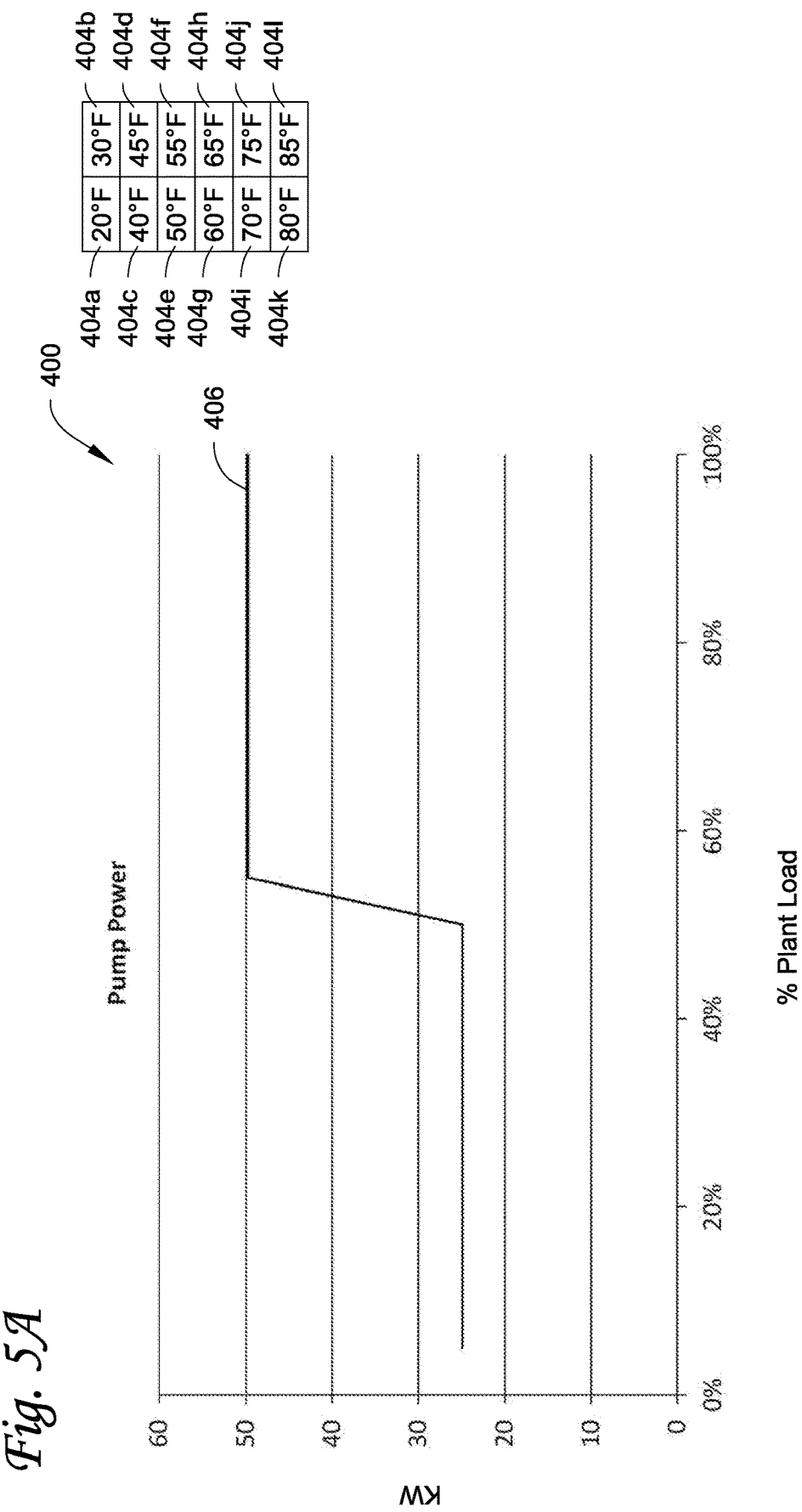
FIGS. 5A and 5B show power graphs according to a method that does not use scaling.
Figure 5B:
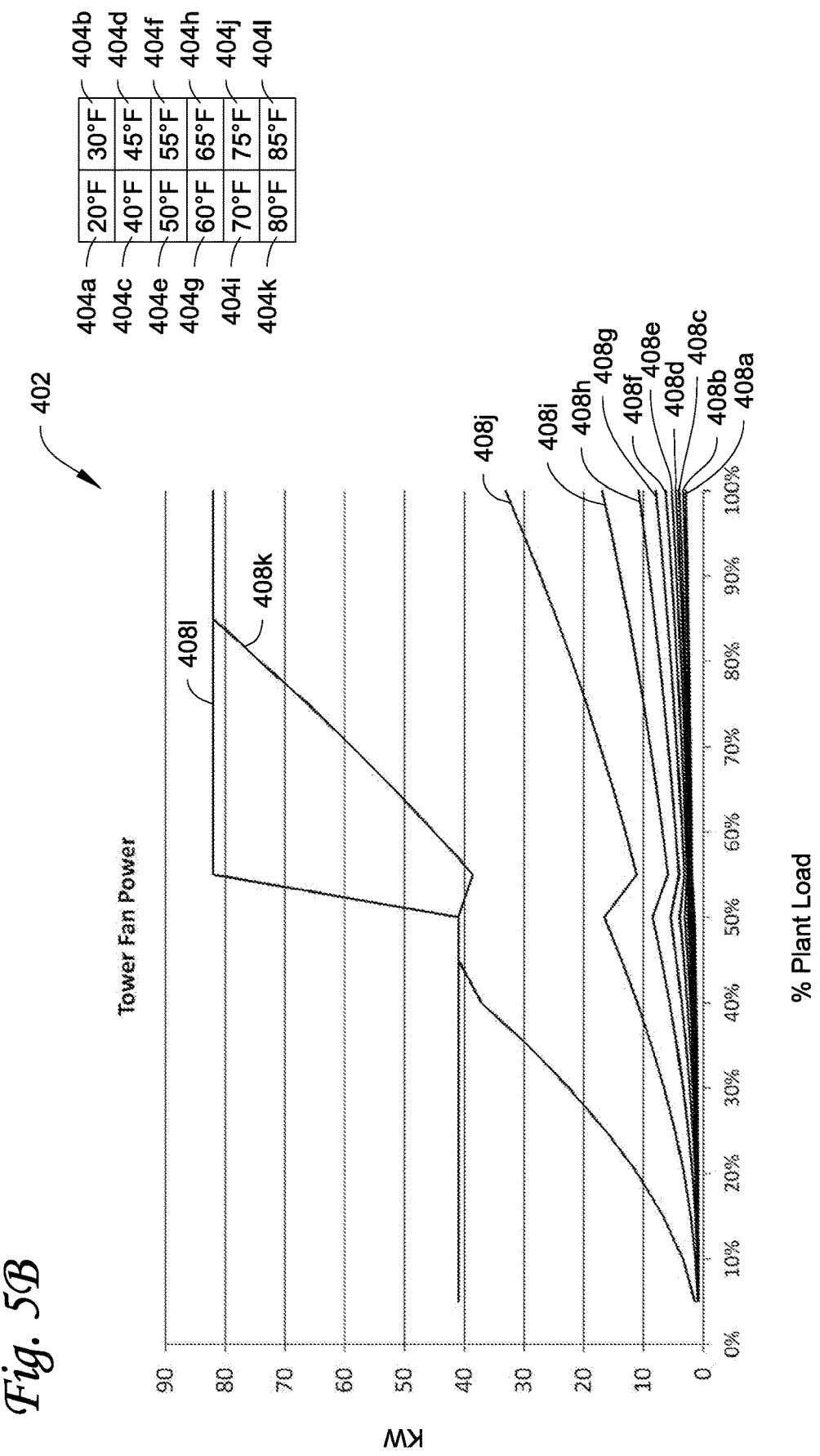

FIGS. 5A and 5B show an analysis of a cooling system using a method that does not use scaling of power input(s) for a cooling system. For example, the power input(s) shown in FIGS. 5A and 5B can be determined from a computer simulation (e.g., using a model of the cooling system). The computer simulation can output the power input(s) data based on the result of either a routine that optimizes the power input(s) and/or the power required to correct for a condition that is either too cold or too warm, for example, for a centrifugal chiller condenser.

FIG. 5A shows a power input graph to a fixed speed condenser pumps 400, and FIG. 5B shows a power input graph for a tower fans 402, wherein the cooling system includes two chillers, two pumps, and two cooling tower cells. The control was set to 75° F. entering chiller condenser water temperature. FIG. 5A shows that for all of the outdoor wet-bulb temperatures 404a-1 (20° F. 404a, 30° F. 404b, 40° F. 404c, 45° F. 404d, 50° F. 404e, 55° F. 404f, 60° F. 404g, 65° F. 404h, 70° F. 404i, 75° F. 404j, 80° F. 404k, 85° F. 404l), the data lines (showing pump power input (kW) vs. % plant load) fall on top of each other, e.g., there is only a single power input profile (e.g., line 406) for the pumps. Thus, FIG. 5A shows that the power input to the fixed condenser pumps does not use any form of scaling (the legend shows wet-bulb temperatures 404a-l). Further, because the two pumps are fixed speed pumps, the data line 406 in the graph 400 shows that prior to 50% plant load only one pump is being used, and just beyond the 50% plant load, both pumps are used. Thus, the resulting power input data line substantially resembles a step-function (see line 406).

FIG. 5B shows that the power input (kW) vs. % plant load varies for each of the outdoor wet-bulb temperatures 404a-1 (same as shown in FIG. 5A). The graph 402 shows that the fans can be operated at variable speeds, for example, in order to maintain a constant 85° F. entering chiller condenser water temperature. However, this methodology of relying on a fixed temperature control for varying the speed (or operation) of the fans is not necessarily as optimal (e.g., efficient) as the system can be. The graph 402 shows that many of the data lines 408a-1 (20° F. 408a, 30° F. 408b, 40° F. 408c, 45° F. 408d, 50° F. 408e, 55° F. 408f, 60° F. 408g, 65° F. 408h, 70° F. 408i, 75° F. 408j, 80° F. 408k, 85° F. 408l) rise in power input to about 50% plant load, and at about 50% plant load, there can be a sudden drop in power input to the tower fans (e.g., 408a-k). The power input to the tower fans can be significantly greater just before about 50% plant load (e.g., 408a-k), which indicates a situation where only one fan might be being operated at a significantly high speed (e.g., max speed) while the second fan and tower cell is not yet operational. The second tower cell and fan is sequenced with the second chiller with the fan power being reduced to maintain a fixed temperature setpoint. This kind of situation can require and use greater power input (e.g., indicated by the sudden drop in power input at or just beyond the 50% plant load) than, for example, two fans being operated at slower speeds. Further, at greater wet-bulb temperatures (e.g., 80° F. 408k and above, e.g., 85° F. 408l), the power input to one fan is maxed at substantially before 50% plant load and then the second fan is operated at its maximum speed almost immediately after it is turned on, as indicated by the data line which resembles a step-function (similar to the data line 406 shown in graph 400 of FIG. 5A). The analysis of the graphs 400, 402 shows that the power input to the pumps and the fans according to these graphs 400, 402 are not efficient.

Figure 6:
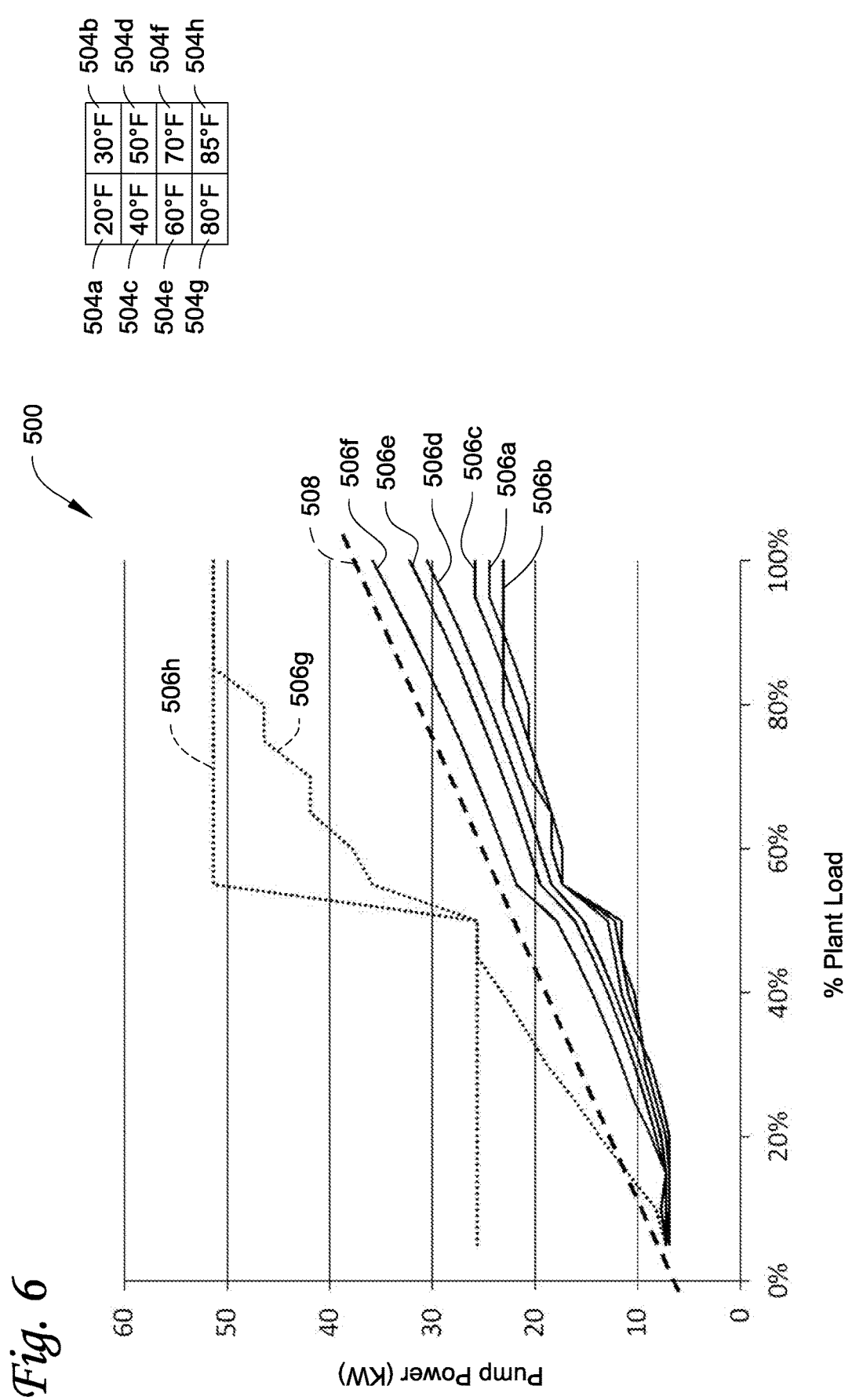
FIG. 6 shows a power graph according to an embodiment.
Figure 7:
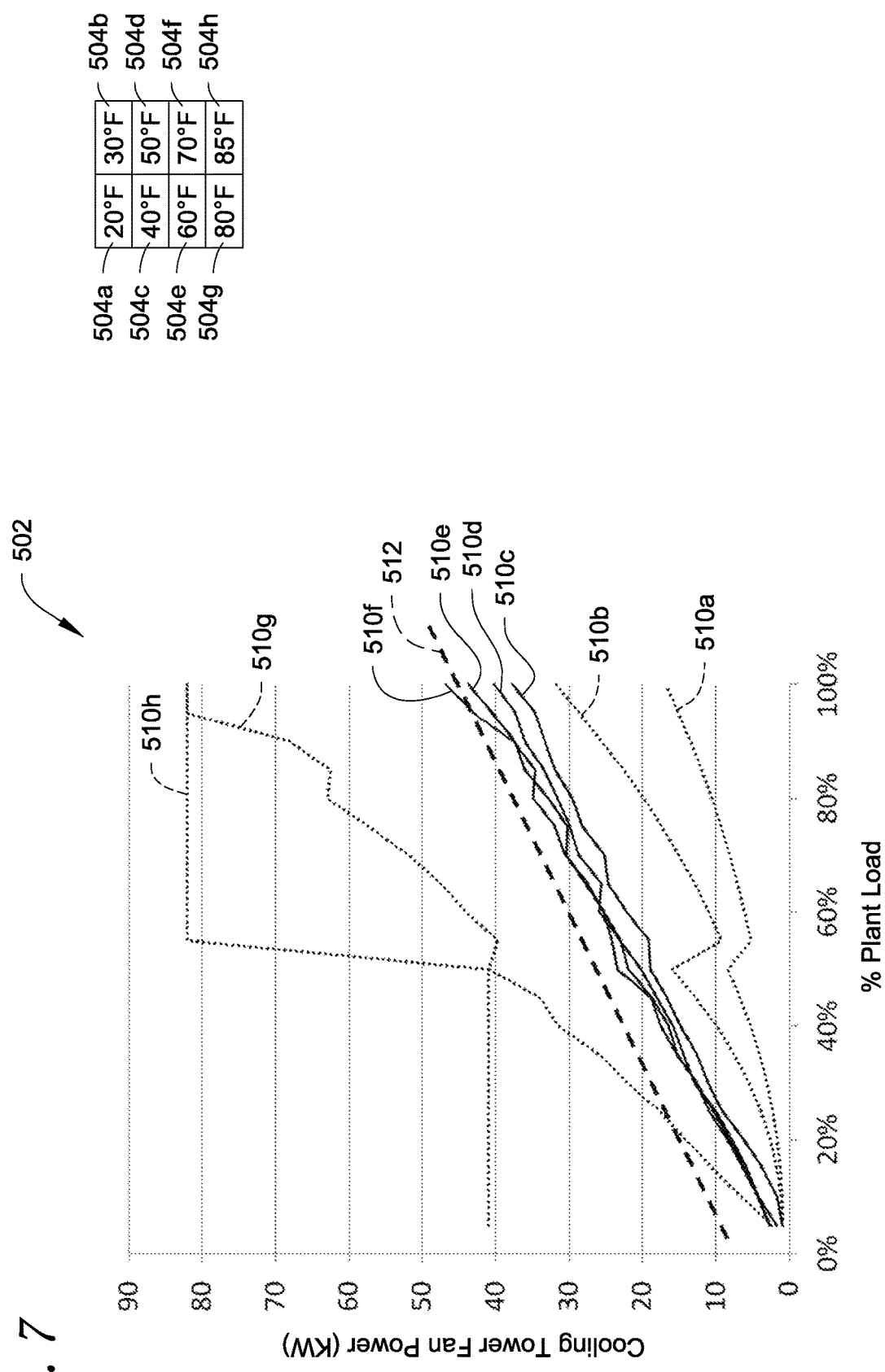
FIG. 7 shows a power graph according to an embodiment.

Example power data are shown as power graphs 500, 502 in FIGS. 6 and 7, respectfully. The graphs 500, 502 shown in FIGS. 6 and 7, respectfully, provide examples of power input optimization (e.g., scaling). The graphs 500, 502 are examples of results according to computer executed instructions executed by a processor (e.g., of a controller and/or a standalone computer), which can determine an optimum power input to a cooling system, and/or a power required to correct for a condition that is either too cold or too warm for a typical centrifugal chiller condenser.

FIG. 6 shows an exemplary power input graph 500 of a cooling system according to an embodiment. In the embodiment shown, the power input graph 500 is for variable speed condenser pumps, wherein the cooling system includes two chillers, two pumps, two tower cell plants, and a controller that optimizes (e.g., scales independently of various conditions, such as outdoor wet-bulb temperature(s)) the power input to the cooling system with an override for a chiller limit condition (e.g., under certain situations, the power to the cooling system can deviate away from the optimization).

FIG. 6 shows that for outdoor wet-bulb temperatures 504a-h(20° F. 504a, 30° F. 504b, 40° F. 504c, 50° F. 504d, 60° F. 504e, 70° F. 504f, 80° F. 504g, and 85° F. 504h), the data lines 506a-h (20° F. 506a, 30° F. 506b, 40° F. 506c, 50° F. 506d, 60° F. 506e, 70° F. 506f, 80° F. 506g, and 85° F. 506h) showing the pump power input (kW) vs. % plant load do not fall on top of each other in a stepwise fashion as compared to the graph shown in FIG. 5A (see data line 406). That is, FIG. 6 shows that the power inputs to the variable speed condenser pumps can be controlled so that the pumps operating efficiently independent of outdoor wet-bulb temperatures. That is, most of the data lines (e.g., 506a-f) in graph 500 show substantially linear progressions. Further, most of the data lines (e.g., 506a-f) in graph 500 are clustered near each other. Accordingly, the embodiment of the methods can apply a scaling (for example, but not limited to, linear scaling, non-linear scaling, scaling having a power to load relationship, a combination thereof, etc.) to generate a scaling line 508 (see dashed line in the graph 500) for the power input to the condenser pumps. Thus, the controller can follow the scaling (represented by the line 508 in this example) and efficiently operate the pumps based on the scaling line 508 independent, for example, of the wet-bulb temperature conditions.

Although most of the data lines 506a-f in the graph 500 track with the scaling line 508 of power input vs. % plant load, some data lines deviate from the scaling line 508 significantly (e.g., near the outer limits for outdoor wet-bulb conditions). For example, the data lines 506g-h for wet-bulb temperatures of at or about 80° F. and at or about 85° F. (e.g., the upper limit) resemble the step function line 406 of FIG. 5A. Accordingly, the controller can deviate from the scaling line 508 at the outer limit situations (e.g., at upper limit, wet-bulb temperature range of at or about 80-85° F. or greater, etc.). Further, the controller can be configured to deviate from the scaling line 508 of the power inputs to the pumps as the outer limit situation is approached (e.g., wet-bulb temperature of at or about 80° F., etc.).

The scaling line 508 and/or the deviation parameter(s) can be determined by the controller and/or by a standalone computer. The controller can control the cooling system according to the scaling line 508 and/or the deviation parameter(s) for achieving greater efficiency than the general method shown in FIG. 5A.

FIG. 7 shows an exemplary power input graph 502 of a cooling system according to an embodiment. The power input graph 502 is for tower fans, wherein the cooling system includes two chillers, two pumps, two tower cell plants, and a controller that optimizes (e.g., scales independently of various conditions, such as outdoor wet-bulb temperature(s)) the power input to the cooling system with an override for a chiller limit condition (e.g., under certain situations, the power to the cooling system can deviate away from the optimization).

FIG. 7 shows that the tower fan power input (kW) vs. % plant load can be set for each of the outdoor wet-bulb temperatures 504a-h(20° F. 504a, 30° F. 504b, 40° F. 504c, 50° F. 504d, 60° F. 504e, 70° F. 504f, 80° F. 504g, and 85° F. 504h). The data lines 510a-h(20° F. 510a, 30° F. 510b, 40° F. 510c, 50° F. 510d, 60° F. 510e, 70° F. 510f, 80° F. 510g, and 85° F. 510h) show what the operating power input might have been when a scaling is not used (e.g., similar to graph 402 in FIG. 5B). However, according to the embodiment of the methods, the controller controls the power inputs to the fans to operate, for example, at varying speeds for power efficient operation. Thus, for most of the data lines 510c-f (e.g., wet-bulb temperatures of 40° F. 504c to 70° F. 504f) in the graph 502 which show a substantially linear progression in power input to the fans and are clustered near each other, the controller can efficiently operate the fans based on a scaling (for example, but not limited to, linear scaling, non-linear scaling, scaling having a power to load relationship, a combination thereof, etc.) to generate a scaling line 512 (dashed line shown in FIG. 7) for most operating situations (e.g., wet-bulb temperatures of 40° F. 504c to 70° F. 504f). Thus, the controller operating according to the scaling line 512 can operate the power input independently, for example, of the wet-bulb temperatures. Further, the controller can avoid in many situations where only one fan is being operated at a significantly high speed (e.g., max speed) while the second fan is not yet operational, and the second fan is turned on when the maximum speed of the first fan is considered to be insufficient (as shown in the graph 402 in FIG. 5B).

Although most of the data lines in the graph 502 track with the scaling line 512 of power input vs. % plant load, there are some deviations at the lower limits (e.g., lines 510a, 510b) and upper limits (e.g., 510g, 510h) of the wet-bulb temperatures. For example, at the lower limit (and near the lower limit), the data lines 510a, 510b deviate significantly from the scaling line 512. Also, at the upper limit (e.g., 510g, 510h), the power input resembles a step-function.

Accordingly, the controller can be configured to deviate from the scaling line 512 at these lower and/or upper limit situations. Further, the controller can be configured to deviate from the scaling line 512 of the power inputs to the fans as the outer limit situation is approached.

The scaling line 508, 512 and/or the deviation parameter(s) can be determined by the controller and/or by a standalone computer. The controller can control the cooling system according to the scaling line 508 and/or the deviation parameter(s) for achieving greater efficiency than the general method shown in FIG. 5B.

Although each of the scaling shown in FIGS. 6 and 7 can be used alone, using both of the scaling shown in FIGS. 6 and 7 in the cooling system can achieve greater efficiencies than using either of the scaling alone.

Figure 8:
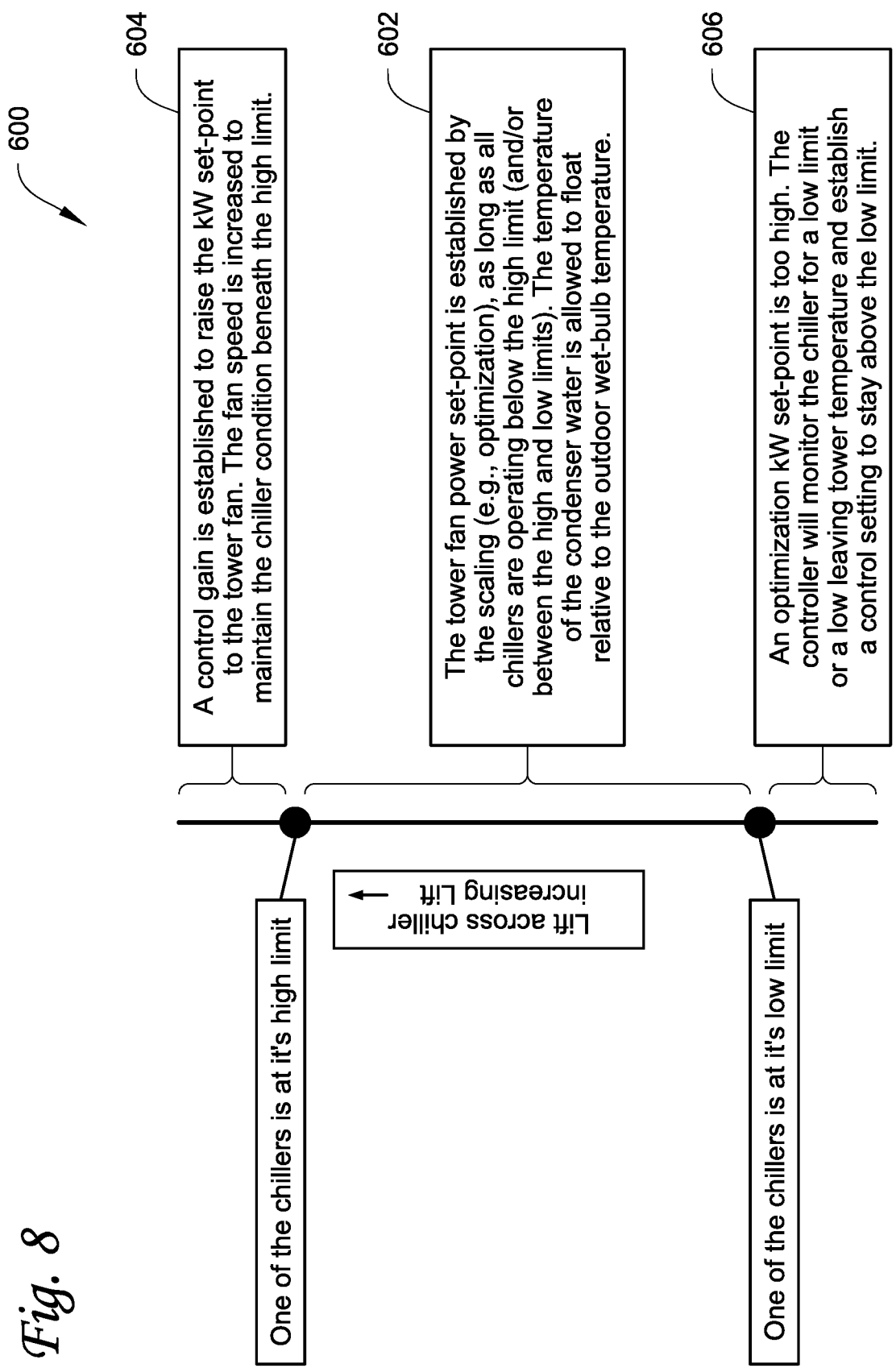
FIG. 8 shows a schematic diagram of one embodiment of a fan control logic, which may be implemented, for example, for a variable speed fan.
Figure 9:
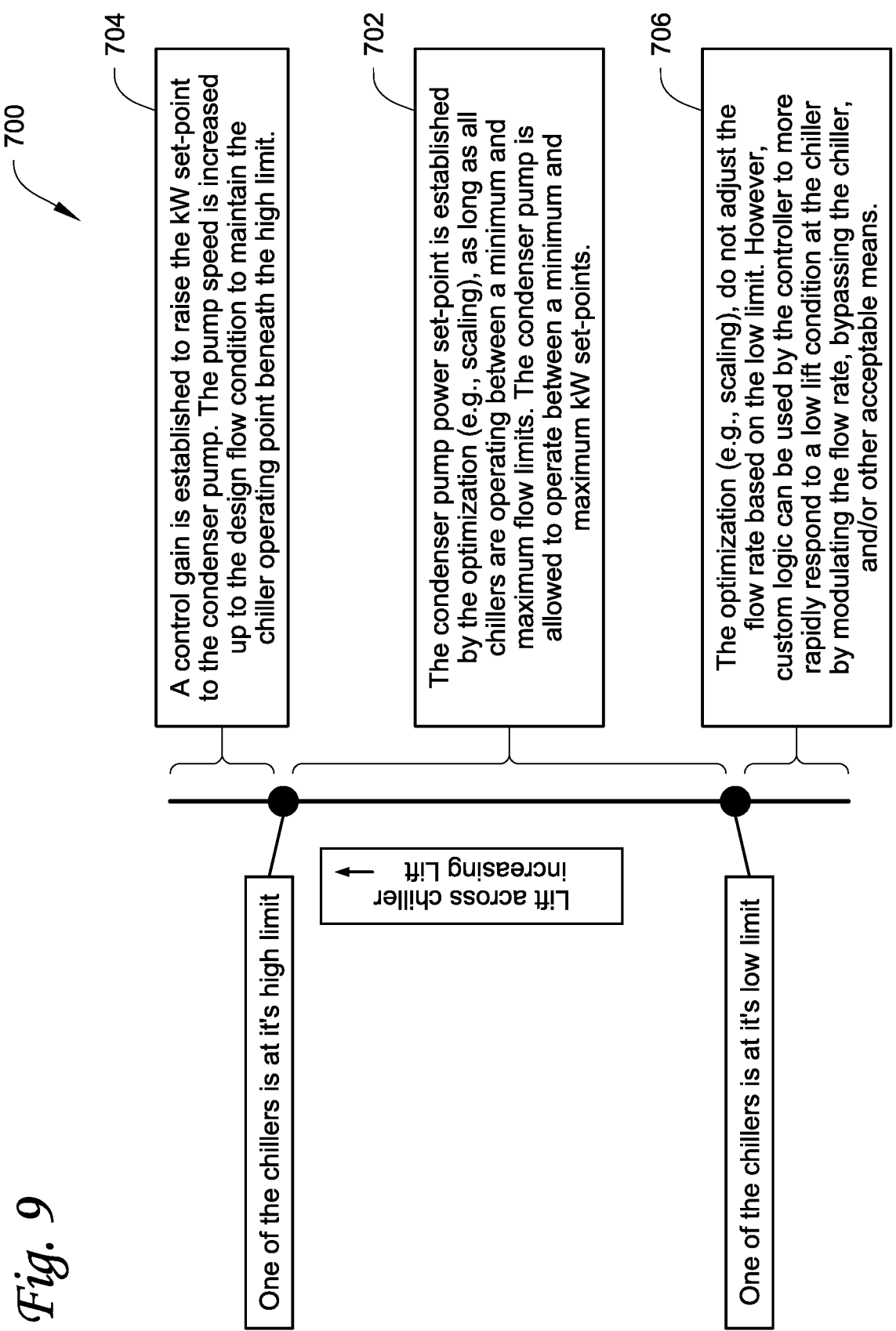
FIG. 9 shows a schematic diagram of one embodiment of a pump control logic, which may be implemented, for example, for a variable speed pump.

FIGS. 8 and 9 show schematic diagrams for various aspects of the control logic which includes overriding aspects when certain conditions are met (e.g., limitations based on lift, wet-bulb temperature limits, etc.). The controller controls the operation of the pumps and/or the fans so that, at or near the upper limits for example of compressor lift such as in for example a centrifugal chiller, the power inputs to the pumps and/or the fans are provided so that the chillers do not surge. As shown, for example, at or near the upper wet-bulb temperature limits, the controller can be adapted (according to the computer-readable instructions) to override the power ratio scaling for the sake of equipment/system protection.

Further, the controller can be adapted (according to the computer-readable instructions) so that the controller operates the tower fans so that, at or near the lower limits of the wet-bulb temperatures, the optimized power inputs to the fans might be reduced from the scaling method to protect the chillers from low limit issues or to ensure tower cells do not encounter freezing conditions (and to avoid other low limit problems).

Accordingly, the controller can control the speed of the condenser pump and the speed of the tower fan so that the power used by these components result in a value comparable to a power setpoint value from an optimization process (e.g., scaling described above) and the controller also monitors the conditions for the chiller to provide alternative power setpoints (e.g., other than the power setpoints derived from the scaling) of the pump and/or tower fan speed when the chiller (or the cooling system as a whole) approaches low or high operational limits. Detecting operating conditions can include detecting condenser water temperature, and otherwise detecting and determining (e.g., monitoring) operational limits (e.g., high lift condition, low lift condition, etc.) of the cooling system. Further, the method can control the cooling system to prevent unwanted conditions from occurring during the operation of the system.

FIG. 8 shows a schematic diagram for one embodiment of a variable speed fan control logic 600. The control logic 600 has three "zones" of control, wherein in the first zone 602, the tower fan power input (e.g., power setpoint) is established by the optimization (e.g., scaling, linear scaling, nonlinear scaling, etc.), which indicates that all of the chiller(s) are operating below their high limits (and/or between low and high limits). The temperature of the condenser water is allowed to float relative to chiller plant load and the outdoor wet-bulb temperature. In the second zone 604, which is when one of the chillers of the cooling system having reached, or close to, or approaches its high limit, the controller raises the power-input to the tower fan (thus increasing the fan speed and/or activating other fans) to maintain the chiller condition below the high limit. In the third zone 606, when the chiller and/or tower temperature is (are) at or close to the respective lower limit(s), the controller determines that the optimization (e.g., scaling, linear scaling, nonlinear scaling, etc.) power setpoint is too high and thus the tower temperature is too low. The controller can monitor the chiller for a low limit and/or a low leaving tower temperature to establish control parameters so that these monitored parameters are above the low limit.

An exemplary portion of a schematic code (e.g., computer-readable and computer-executable instructions) for the fan control logic is shown below.

An exemplary portion of a schematic code for determining chiller sensitivity is shown below.

```
Function DetermineChillerSensitivity(chiller operating data)
  # Compute the chiller power sensitivity
  # Output
  #   chiller sensitivity
  # Inputs
  #   chiller operating data - parameters detailing actual operating
  conditions
Start Function( )
    {
        Assign chiller design parameters from selection data
    At chiller operating conditions, compute the chiller load
        At chiller operating conditions, compute the chiller power
        Compute the chiller power at (lift – 1)
        Chiller power sensitivity = f(delta_chiller_kW, delta
        chiller lift)
    }
End Function( )
```

An exemplary portion of a schematic code for determining chiller high limit is shown below.

```
Function DetermineChillerSensitivity(chiller operating data)
  # Compute the chiller power sensitivity
  # Output
  #   chiller sensitivity
  # Inputs
  #   chiller operating data - parameters detailing actual operating
  conditions
Start Function( )
    {
        Assign chiller design parameters from selection data
    At chiller operating conditions, compute the chiller load
        At chiller operating conditions, compute the chiller power
        Compute the chiller power at (lift – 1)
        Chiller power sensitivity = f(delta_chiller_kW, delta
        chiller lift)
    }
End Function( )
```

```
Function DetermineFanSetpoint(WB, targsens)
  # Compute the cooling tower fan power sensitivity and compare to a target value.
  # Output
  #   a kW setpoint for a tower fan at a given ambient wet-bulb condition
  # Inputs
  #   targsens    - target sensitivity for the chiller at load
  #   WB          - wet-bulb value
Start Function( )
    {
    Assign tower performance parameters from cooling tower data
    Compute the design heat rejection: f(dT)
    Water flow = constant at design conditions
    From full_fan_flow; full_fan_power
        {
        Entering_tower_temperature = f(design_value, heat_rejection,
fan_flow_rate, ambient_wet-bulb)
        }
    Begin Loop:
        {
        Decrement fan flow
        Determine fan_power
        Determine entering_tower_temperature
        power sensitivity = f(delta_fan_kW, delta_entering_tower_temperature)
    If power_sensitivity = target_sensitivity
        {
        last_power_computed is power returned from the function
        }
    If target_sensitivity = !reached then go to "begin loop" and decrement
    }
End Function( )
```

An exemplary portion of a schematic code for determining chiller low limit is shown below.

```
Function DetermineChillerLowLimit(chiller operating data)
  # Compute the tower low limit based on chiller conditions
  # Output
  #   tower low limit from computed chiller low limit
  # Inputs
  #   chiller operating data - parameters detailing actual operating
  conditions
Start Function( )
  {
    Assign chiller design parameters from selection data
    At chiller operating conditions, compute the minimum chiller lift
        Determine tower low limit = f(current operating
conditions, minimum chiller lift)
  }
End Function( )
```

FIG. 9 shows a schematic diagram for one embodiment of a variable speed pump control logic 700. The control logic 700 has three "zones" of control, wherein in the first zone 702, the pump power input is established by the optimization (e.g., scaling, linear scaling, nonlinear scaling, etc.), which indicates that the chillers are operating between a minimum and maximum flow points. The controller controls the power input to the pumps, for example, when the pumps are operating within a low and high flow limits as determined by either the tower cell components that are activated or the flow limits of the chiller(s). In the second zone 704, which is when one of the chillers of the cooling system having reached its high limit, the controller raises the power-input to the pump (thus increasing the pump speed and/or activating other pumps) to maintain the chiller condition below the high limit as long as a maximum flow limit is not exceeded. In the third zone 706, when the chiller and/or tower temperature is (are) at the respective lower limit(s), the controller does not adjust the water flow rate based on the lower limit(s), but instead, relies on the tower fan control to maintain a condenser water temperature at or above the minimum requirement. However at times, specialized control logic may be required to react to low limit conditions more rapidly than the temperature based control available from the tower fans. In these cases, the controller modulates the water rate and/or the controller controls a bypass mechanism so that the water partially bypasses the chiller to avoid the chiller limit condition (and/or to avoid other problems associated with low limit conditions).

An exemplary portion of a schematic code for the pump control logic is shown below.

```
Function DeterminePmpSetpoint(WB, targsens)
  # Compute the condenser pmp power sensitivity and compare to a target value.
  # Output
  #   a kW setpoint for a cond pmp at a given ambient wet-bulb condition
  # Inputs
  #   targsens  - target power sensitivity for the chiller at load
  #   WB        - wet-bulb value
Start Function( )
  {
    Assign tower performance parameters from cooling tower data
    Compute the design heat rejection: f(dT)
    Tower Air Flow = constant at design conditions
    From full_pump_flow; full_pump_power
      {
        Entering_tower_temperature = f(design_value, heat_rejection,
pmp_flow_rate, ambient_wet-bulb)
      }
    Begin Loop:
      {
        Decrement pump flow
        Determine pump_power
        Determine entering_tower_temperature
        power sensitivity = f(delta_pump_kW, delta_entering_tower_temperature)
      If power_sensitivity = target_sensitivity
        {
          last_power_computed is power returned from the function
        }
      If target_sensitivity = !reached then go to "begin loop" and decrement
      }
End Function( )
```

An embodiment of the methods can predetermine the power setpoints (e.g., scaling). That is, an embodiment of the methods can require that the power set points (based on a scaling and for the upper and/or lower limits of wet-bulb temperatures) for the cooling system is predetermined in the computer-readable instructions stored in the non-transitory memory of the controller. Accordingly, the power setpoints and the scaling are predetermined for the efficient operation of the cooling system (e.g., condenser/tower system). Further, the controller can operate the cooling system according to a method which overrides the scaling at the limits so that the controller maintains desired parameters (e.g., acceptable water flow rate) for the cooling system. In another embodiment, the controller does not rely solely on a compressor load metric for controlling the one or more pumps and/or one or more tower fans.

Aspects

It is noted that any of the features in any of the aspects below can be combined with any of the other aspects.

Aspect 1. A method for controlling a chiller plant with a computer, comprising:

the computer determining a first sensitivity of a first power input to a chiller as a function of lift;

the computer determining a second sensitivity of a second power input to one or more component(s) of the chiller plant as a function of lift; and the computer aligning the first sensitivity with the second sensitivity.

Aspect 2. The method according to aspect 1, wherein the computer is a controller of the chiller plant.

Aspect 3. The method according to any of the aspects 1-2, setting power setpoints for the one or more component(s) based on the alignment of the first sensitivity with the second sensitivity.

Aspect 4. The method according to any of the aspects 1-3, wherein the lift is a difference between a condenser condition and an evaporator condition.

Aspect 5. The method according to any of the aspects 1-4, wherein the condenser condition includes a condenser temperature.

Aspect 6. The method according to any of the aspects 1-5, wherein the condenser condition includes a condenser pressure.

Aspect 7. The method according to any of the aspects 1-6, wherein the evaporator condition includes an evaporator temperature.

Aspect 8. The method according to any of the aspects 1-7, wherein the evaporator condition includes an evaporator pressure.

Aspect 9. The method according to any of the aspects 1-8, further comprising:

determining an upper limit condition of the chiller plant; and setting alternative control setpoints for each of the one or more component(s) near or at the upper limit condition, wherein the alternative control setpoints are different from the power setpoints based on a scale.

Aspect 10. The method according to any of the aspects 1-9, wherein the upper limit condition is based on the lift.

Aspect 11. The method according to any of the aspects 1-10, further comprising:

determining a lower limit condition of the chiller plant; and setting alternative control setpoints for each of the one or more component(s) near or at the lower limit condition, wherein the alternative control setpoints are different from the power setpoints based on a scale.

Aspect 12. The method according to any of the aspects 1-11, wherein the lower limit condition is based on the lift.

Aspect 13. The method according to any of the aspects 1-12, further comprising sequencing activations, deactivations, and/or controlling parameters of the one or more component(s).

Aspect 14. The method according to any of the aspects 1-13, wherein the sequencing activations and/or deactivations of the one or more component(s) include sequencing tower cells.

Aspect 15. The method according to any of the aspects 1-14, wherein the sequencing activations and/or deactivations of the one or more component(s) include sequencing only the tower cells.

Aspect 16. A method for controlling a chiller plant with a controller, comprising:

the controller setting a power input control scheme for one or more component(s) of the chiller plant by determining an amount of power needed by the one or more component(s) of the chiller plant at a chiller load; setting a scale based on the amount of power used by the one or more component(s) of the chiller plant at the chiller load; and setting power setpoints for each of the one or more component(s) based on the scale.

Aspect 17. The method according to any of the aspects 1-16, wherein the one or more component(s) include one or more pumps; and the controller setting the power input control scheme further includes determining a sensitivity of a power value of the one or more pumps to a change in system temperature; and balancing the scale to the sensitivity.

Aspect 18. The method according to any of the aspects 1-17, wherein the one or more component(s) include one or more fans; and the controller setting the power input control scheme further comprises determining a sensitivity of a power value of the one or more fans to a change in system temperature; and balancing the scale to the sensitivity.

Aspect 19. The method according to any of the aspects 1-18, wherein the one or more component(s) include one or more pumps and one or more fans; and the controller setting the power input control scheme further includes determining a sensitivity of a power value of the one or more pumps to a change in system temperature; determining a sensitivity of a power value of the one or more fans to a change in system temperature; and balancing the scale to the sensitivity of a power value of the one or more pumps and the sensitivity of a power value of the one or more fans.

Aspect 20. The method according to any of the aspects 1-19, further comprising:

determining an upper limit condition of the chiller plant; and setting alternative control setpoints for each of the one or more component(s) near or at the upper limit condition, wherein the alternative control setpoints are different from the power setpoints based on the scale.

Aspect 21. The method according to any of the aspects 1-20, wherein the upper limit condition includes an upper limit for a component operating condition.

Aspect 22. The method according to any of the aspects 1-21, further comprising:

determining a lower limit condition of the chiller plant; and setting alternative control setpoints for each of the one or more component(s) near or at the lower limit condition, wherein the alternative control setpoints are different from the power setpoints based on the scale.

Aspect 23. The method according to any of the aspects 1-22, wherein the lower limit condition includes a lower limit for a component operating condition.

Aspect 24. The method according to any of the aspects 1-23, wherein the scale is independent of wet-bulb temperature.

Aspect 25. The method according to any of the aspects 1-24, wherein the scale includes a linear scale.

Aspect 26. The method according to any of the aspects 1-25, wherein the scale includes a non-linear scale.

Aspect 27. The method according to any of the aspects 1-26, wherein the scale is based on a power to load relationship.

Aspect 28. A method for operating a water-cooled cooling system having a controller which controls one or more chillers and one or more other components, comprising:

the controller determining operational parameters for sequencing controlling parameters of the one or more chillers and/or the one or more other components based on a first sensitivity of a power input to the one or more chillers as a function of lift and a second sensitivity of a power input to the one or more other components as a function of lift.

Aspect 29. The method according to any of the aspects 1-28, further comprising:

the controller aligning the first sensitivity with the second sensitivity.

Aspect 30. The method according to any of the aspects 1-29, further comprising:
the controller sequencing the controlling parameters of the one or more chillers.

Aspect 31. The method according to any of the aspects 1-30, further comprising:
the controller sequencing the controlling parameters of the one or more other components.

Aspect 32. The method according to any of the aspects 1-31, wherein determining the controlling parameters includes determining activation(s) and/or deactivation(s) of the one or more other components.

Aspect 33. A chiller plant, comprising:
one or more chiller(s);
one or more condenser pump(s) for pumping fluid;
one or more tower fan(s) for cooling the fluid;
a fluid circuit for directing a flow of the fluid pumped by the one or more condenser pump(s) between the one or more chiller(s) and the one or more tower fan(s); and
a controller for controlling power input to the one or more condenser pump(s) and the one or more tower fan(s), the controller having a processor, a non-transitory memory, and computer-readable instructions stored on the non-transitory memory which can be executed by the processor, the computer-readable instructions for controlling the chiller plant according to any of the aspects 1-32.

Aspect 34. The chiller plant according to aspect 33, wherein the one or more condenser pump(s) include(s) one or more variable speed condenser pump(s).

Aspect 35. The chiller plant according to any of the aspects 33-34, wherein the one or more condenser pump(s) include(s) one or more constant speed condenser pump(s).

Aspect 36. The chiller plant according to any of the aspects 33-35, wherein the one or more tower fan(s) include(s) one or more variable tower fan(s).

Aspect 37. A non-transitory memory, comprising:
computer-readable instructions which can be executed by a processor, the computer-readable instructions including computer-executable instructions for controlling a chiller plant according to any of the aspects 1-32.

What is claimed is:

1. A computer-implemented method for controlling a chiller plant with a controller device, comprising:
the controller device setting a power input control scheme for one or more component(s) of the chiller plant by determining an amount of power needed by the one or more component(s) of the chiller plant at a chiller load, the controller device determining a sensitivity of a power value for the one or more component(s) to a change in system temperature, the sensitivity being a change in the power value for the one or more component(s) with respect to a change to the system temperature;
the controller device setting a scale based on the amount of power needed by the one or more component(s) of the chiller plant at the chiller load;
the controller device setting power setpoints for each of the one or more component(s) based on the scale; and
the controller device determining a relationship between the scale and the sensitivity,
wherein the sensitivity is represented as $\Delta kW/\Delta lift$, $\Delta kW$ being the change to the power value, and $\Delta lift$ being a change to a lift.

2. The computer-implemented method according to claim 1, wherein the one or more component(s) of the chiller pant include one or more pumps,
the controller device determines the sensitivity of the power value of the one or more pumps to the change in system temperature.

3. The computer-implemented method according to claim 1, wherein the one or more component(s) of the chiller pant include one or more fans,
the controller device determines the sensitivity of the power value of the one or more fans to the change in system temperature.

4. The computer-implemented method according to claim 1, wherein the one or more component(s) include one or more pumps and one or more fans,
the controller device determining the sensitivity comprises;
the controller device determining a first sensitivity of a first power value of the
one or more pumps to a change in system temperature, and
the controller device determining a second sensitivity of a second power value of
the one or more fans to the change in system temperature; and
the controller device determining the relationship between the scale and the sensitivity further comprises the controller device determining a relationship between the scale and the first sensitivity of the first power value of the one or more pumps and the second sensitivity of the second power value of the one or more fans.

5. The computer-implemented method according to claim 1, further comprising:
the controller device determining an upper limit condition of the chiller plant; and
the controller device setting alternative control setpoints for the one or more component(s) substantially at the upper limit condition, wherein the alternative control setpoints are different from the power setpoints based on the scale.

6. The computer-implemented method according to claim 5, wherein the upper limit condition includes an upper limit for a component operating condition.

7. The computer-implemented method according to claim 5, further comprising:
the controller device determining a lower limit condition of the chiller plant; and
the controller device setting alternative control setpoints for the one or more component(s) substantially at the lower limit condition, wherein the alternative control setpoints are different from the power setpoints based on the scale.

8. The computer-implemented method according to claim 7, wherein the lower limit condition includes a lower limit for a component operating condition.

9. The computer-implemented method according to claim 1, further comprising:
the controller device determining a lower limit condition of the chiller plant; and
the controller device setting alternative control setpoints for the one or more component(s) substantially at the lower limit condition, wherein the alternative control setpoints are different from the power setpoints based on the scale.

10. The computer-implemented method according to claim 1, wherein the scale is independent of wet-bulb temperature.

11. The computer-implemented method according to claim 1, wherein the scale includes a linear scale.

12. The computer-implemented method according to claim 1, wherein the scale includes a non-linear scale.

13. The computer-implemented method according to claim 1, wherein the scale is based on a power to load relationship.

14. A chiller plant, comprising:
one or more chiller(s);
one or more condenser pump(s) for pumping fluid;
one or more tower fan(s) for cooling the fluid;
a fluid circuit for directing a flow of the fluid pumped by the one or more condenser pump(s) between the one or more chiller(s) and the one or more tower fan(s); and
a computer-implemented controller device for controlling power inputs, the computer-implemented controller device including:
a processor executing computer-readable instructions for controlling the chiller plant,
wherein the processor determines a first sensitivity of a first power input to one of the chiller(s) as a first function of lift,
the processor determines a second sensitivity of a second power input to one or more component(s) of the chiller plant as a second function of lift,
the processor aligns the first sensitivity with the second sensitivity, and
the processor sets power setpoints for one or more of the components based on the alignment of the first sensitivity with the second sensitivity.

15. The chiller plant according to claim 14, wherein the one or more condenser pump(s) include(s) one or more variable speed condenser pump(s).

16. The chiller plant according to any of the claim 14, wherein the one or more condenser pump(s) include(s) one or more constant speed condenser pump(s).

17. The chiller plant according to any of the claim 14, wherein the one or more tower fan(s) include(s) one or more variable capacity tower fan(s).

18. The computer-implemented method according to claim 1, wherein the sensitivity is a change in a first parameter with respect to a change in a second parameter, the second parameter is different from the first parameter.

19. The chiller plant according to any of the claim 14, wherein when the processor aligns the first sensitivity with the second sensitivity, the processor sets the first sensitivity to be equal to the second sensitivity.

20. The computer-implemented method according to claim 1, wherein the scale is configured to scale up or scale down the amount of power needed by the one or more component(s) of the chiller plant at the chiller load, and the power setpoints are set as a scaled function of the chiller load using scaling fit.

* * * * *